(12) United States Patent
Fallon et al.

(10) Patent No.: US 8,934,125 B2
(45) Date of Patent: Jan. 13, 2015

(54) USING A GRAPHICS ENGINE TO PROCESS PRINT REQUESTS

(75) Inventors: Michael F. Fallon, Tiverton, RI (US); Myles Wilde, Charlestown, MA (US); Matthew J. Adiletta, Bolton, MA (US); Stewart Taylor, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,065

(22) PCT Filed: Oct. 1, 2011

(86) PCT No.: PCT/US2011/054489
§ 371 (c)(1),
(2), (4) Date: Apr. 23, 2014

(87) PCT Pub. No.: WO2013/048532
PCT Pub. Date: Apr. 4, 2013

(65) Prior Publication Data
US 2014/0226178 A1    Aug. 14, 2014

(51) Int. Cl.
*G06F 15/00* (2006.01)
*G06F 3/12* (2006.01)
*G06K 1/00* (2006.01)
*G06F 13/38* (2006.01)
*G03G 15/00* (2006.01)
*G06K 15/02* (2006.01)

(52) U.S. Cl.
CPC .............. *G06F 3/1205* (2013.01); *G06F 13/38* (2013.01); *G03G 15/50* (2013.01); *G06K 15/1856* (2013.01); *G06F 3/126* (2013.01); *G06F 3/1284* (2013.01); *G06F 3/122* (2013.01); *G06F 3/1247* (2013.01); *G06F 3/1279* (2013.01)
USPC .......................................... 358/1.15; 358/1.1

(58) Field of Classification Search
CPC ..... G06F 3/1205; G06F 3/126; G06F 3/1284; G06F 3/122; G06F 3/1247; G06F 3/1279
USPC ................................ 358/1.1, 1.15, 1.13, 1.14
See application file for complete search history.

(56) References Cited

U.S. PATENT DOCUMENTS 7,768,661 B2 *   8/2010   Mitsui ........................ 358/1.13
7,982,892 B2 *   7/2011   Yamamura .................. 358/1.15
(Continued)

FOREIGN PATENT DOCUMENTS

TW        200426678 A       12/2004
TW        200632775 A        9/2006
(Continued)

OTHER PUBLICATIONS

International Search Report and Written Opinion received for PCT application No. PCT/US2011/054489, mailed on May 10, 2012, 10 pages.
(Continued)

*Primary Examiner* — Douglas Tran
(74) *Attorney, Agent, or Firm* — Jordan IP Law, LLC

(57) ABSTRACT

Systems and methods of operating a computing system may involve utilizing an graphics engine to complete a print request. Upon receiving a request to print a scheduling management application may direct an application programming interface call to the graphics engine, and the graphics engine may process a print imaging instruction.

30 Claims, 3 Drawing Sheets

(56) References Cited

U.S. PATENT DOCUMENTS

| | | |
|---|---|---|
| 2004/0184059 A1 | 9/2004 | Chun et al. |
| 2006/0132491 A1 | 6/2006 | Riach et al. |
| 2009/0207439 A1 | 8/2009 | Oomura |
| 2010/0313123 A1 | 12/2010 | Tomomatsu |
| 2010/0315437 A1 | 12/2010 | Sinclar et al. |
| 2011/0176826 A1 | 7/2011 | Yamamichi |

FOREIGN PATENT DOCUMENTS

| | | |
|---|---|---|
| TW | 200920610 A | 5/2009 |
| TW | 201033811 A | 9/2010 |
| WO | 2013/048532 A1 | 4/2013 |

OTHER PUBLICATIONS

International Preliminary Report on Patentability and Written Opinion received for PCT Patent Application No. PCT/US2011/054489, mailed on Apr. 10, 2014, 7 pages.

Office Action received for Taiwan Patent Application No. 101135592, mailed on Sep. 3, 2014, 9 pages of English Translation and 8 pages of Taiwan Office Action.

* cited by examiner

US 8,934,125 B2

USING A GRAPHICS ENGINE TO PROCESS PRINT REQUESTS

BACKGROUND

1. Technical Field

Embodiments generally relate to processing print requests. More particularly, embodiments relate to utilizing a graphics engine to conduct print processing, imaging, and rendering activities.

2. Discussion

A challenge of designing and manufacturing printers may relate to balancing cost and capability. An application specific integrated circuit (ASIC) that is customized to perform particular print functionalities may be inexpensive, but may also be inflexible. On the other hand, a general purpose processor may be more flexible, but may be more expensive and lower-performing.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
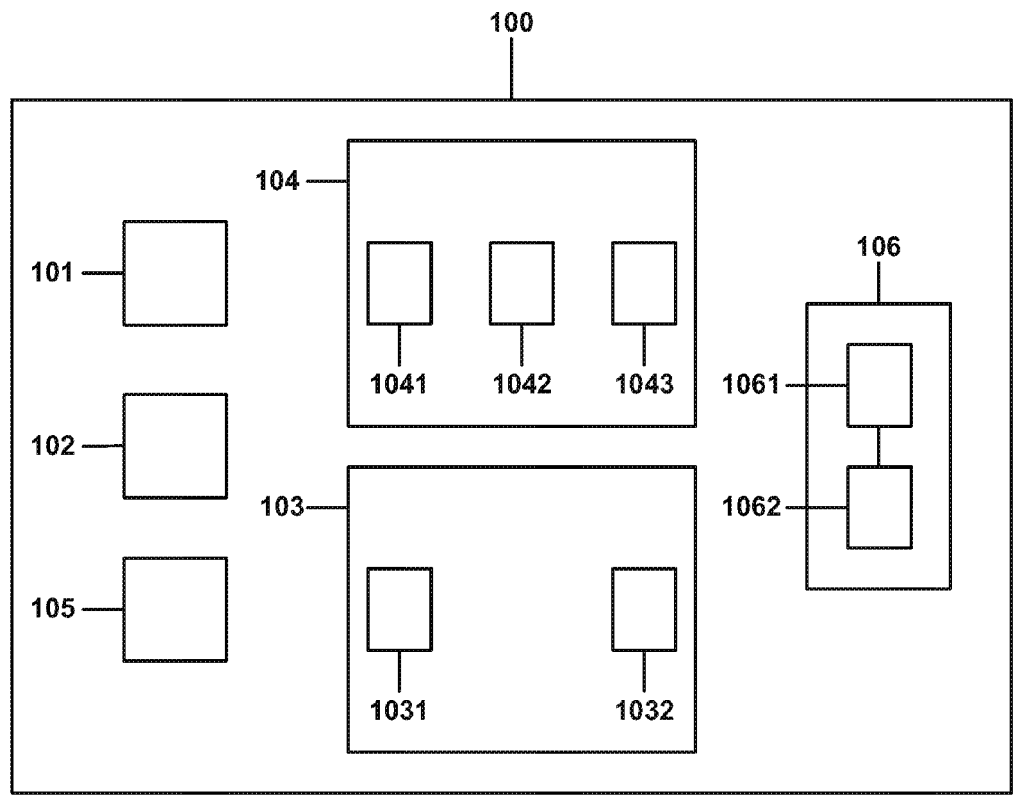
FIG. 1 is a block diagram of an example of a computing system including a printer processing component in accordance with an embodiment of the invention.

Embodiments may involve a computer implemented method including receiving a print request to print a document, initializing a printer execution assembly of a printer, and initiating, by a general purpose processor, a scheduling management application. The method may also provide for receiving, at the scheduling management application, an application programming interface call, directing, by the scheduling management application, an application programming interface call to a graphics engine, and directing a function call for a print imaging application on the application programming interface, the print imaging application including a print imaging application instruction. In addition, the method may include utilizing the graphics engine to process the print imaging application instruction and executing the print request at the printer execution assembly.

Embodiments may include a computer readable storage medium having a set of instructions which, if executed by a processor, cause a computer to receive a print request to print a document, initialize a printer execution assembly of a printer, and initiate, by a general purpose processor, a scheduling management application. The instructions may also cause a computer to receive, at the scheduling management application, an application programming interface call, direct, by the scheduling management application, an application programming interface call to a graphics engine, and direct a function call for a print imaging application on the application programming interface. The print imaging application may include a print imaging application instruction. In addition, the instructions may also cause a computer to utilize a graphics engine to process the print imaging instruction and execute the print request at the printer execution assembly.

In addition, embodiments may include an system having a transceiver to communicate wirelessly via a wireless communication protocol, a printer display interface to display a graphical user interface (GUI), and a printer execution assembly to execute a print request, the print execution assembly including a printer head, a supporting roller, and a document tray. The system may also include a memory device to store an application programming interface, a print imaging application including a print imaging application instruction, and a scheduling management application including a scheduling management application instruction. Also, the system may include a printer processing component including a general purpose processor to process the scheduling management application instruction, and a graphics engine to process the print imaging application instruction.

Moreover, embodiments may include an apparatus having a memory device to store an application programming interface, a print imaging application including a print imaging application instruction, and a scheduling management application including a scheduling management application instruction. The apparatus may also include a printer processing component including a general purpose processor to process the scheduling management application instruction, and a graphics engine to process the print imaging application instruction.

Turning now to FIG. 1, a block diagram of a printer 100 is shown. The printer 100 may include any device capable of receiving a print request and executing it. The illustrated printer 100 includes a printer transceiver 101, a printer interface 102, a printer scan assembly 103, a printer execution assembly 104, a printer memory 105, and a printer processing component 106.

The printer transceiver 101 may allow the printer 100 to communicate wirelessly via various wireless communication protocols with other devices, such as WiFi (e.g., IEEE 802.11, 1999 Edition, LAN/MAN Wireless LANS), Bluetooth (e.g., IEEE 802.15.1-2005, Wireless Personal Area Networks), and WiMax (e.g., IEEE 802.16-2004, LAN/MAN Broadband Wireless LANS). The printer interface 102 may include an interface that allows a user to interact with the printer 100. For example, the printer 102 may be a display screen displaying a graphical user interface (GUI).

The printer scan assembly 103 may be an electromechanical apparatus configured to scan documents. The printer scan assembly 103 may include, among other things, a document sheet support unit 1031 and a scan unit 1032. The document sheet support unit 1031 may support a document during while the scan unit 1032 scans an image of a document.

The printer execution assembly 104 may be an electromechanical apparatus configured to execute print requests. The printer execution assembly 104 may include, among other things, a printer head 1041, a supporting roller 1042, and a document tray 1043.

The printer memory 105 may be a memory device that can be used to store data. For example, as will be discussed in greater detail, printer memory 105 may be utilized to store various software applications.

The printer processing component 106 may include at least one computer processor to execute computer-readable executable instructions. As will be discussed in greater detail, the printer processing component 106 may include a general purpose processor 1061 and a graphics engine 1062.

Figure 2:
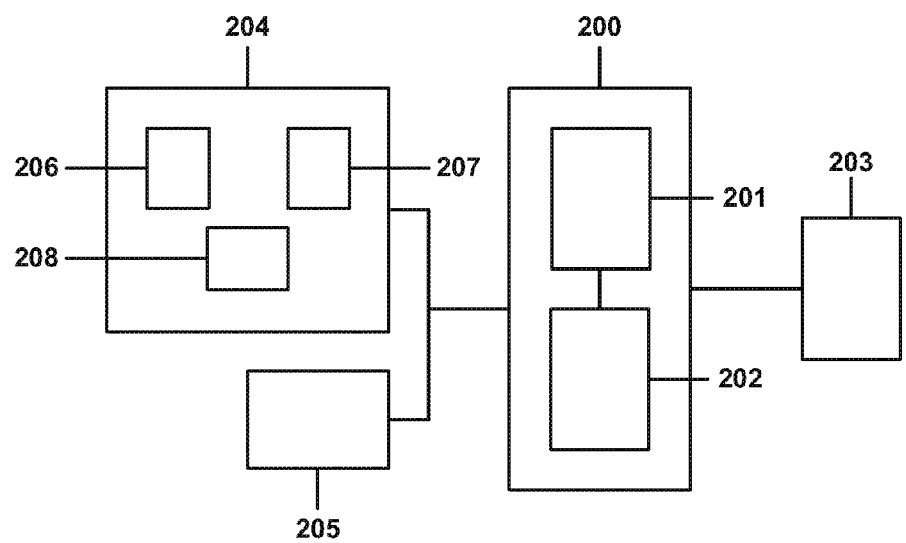
FIG. 2 is a block diagram of an example of a printer processing component including an graphics engine in accordance with an embodiment of the invention.

Turning now to FIG. 2, a block diagram of a printer processing component 200 including general purpose processor 201 and graphics engine 202 is shown. The printer processing component 200 may perform control and dataplane processing. Control processing may include, for example, main application and memory processing. Dataplane processing may include performance-intensive digital signal processing (DSP) functions, such as pre-video processing, post-video processing, video codec processing, image processing, protocol processing, and baseband signal processing.

The illustrated printer processing component 200 is coupled to an ASIC 203, printer memory 204, and a fixed function hardware element 205. The ASIC 203 may be an application-specific integrated circuit that may be customized for a particular task (e.g., image/video capture and output). The fixed function hardware element 205 may be a logic component with a fixed functionality (e.g., directed to a particular aspect of a shading functionality). The printer memory 204 may include any memory device that may be used to store data. For example, a print imaging application 206, an application programming interface (API) 207, and a scheduling management application 208 may be stored on the printer memory 204.

The API 207 may be a set of rules, instructions, and specifications that software programs, such as the print imaging applications 206, may follow to communicate with each other. For example, an API such as OpenGL (e.g., Open Graphics Library release 4.2) may be utilized. OpenGL, is a standard specification defining a cross-language, cross-platform API to implement a print imaging application that produces 2D and 3D computer graphics. A print imaging application, such as the print imaging application 206, may make an API call to the OpenGL library in order to accelerate industry-standard print imaging functions (e.g., half-toning, decompression, color spacing, image rendering, gamma correction, de-skewing) on a graphics engine, such as graphics engine 202. The scheduling management application 208 may direct an issued API call to one of the general purpose processor 201 or the graphics engine 202.

The general purpose processor 201 may be a multi-purpose processor, such as an Intel architecture (iA, e.g., Atom 64-bit) processor, and may be configured to perform control and dataplane processing. By way of example, in the case of a scan-to-print request from a user, the general purpose processor 201 may implement various preparatory control processing functions to prepare hardware components to process instructions relating to the scan-to-print function. For example, these preparatory control processing functions may include initiating the scheduling management application 208, initializing a coupled printer scan assembly, such as printer scan assembly 103 (FIG. 1) for scanning, and initializing a coupled printer execution assembly, such as printer execution assembly 104 (FIG. 1), to receive data from the printer processing component 200.

The graphics engine 202 may be a computer processor configured to compute graphical transformations. In some cases, the graphics engine 202 may achieve better results than the general purpose processor 201 with regard to dataplane processing (e.g., print rendering, print imaging), and may free up the general purpose processor 201 to execute other control and dataplane processing requests.

Moreover, unlike the ASIC 202 and the fixed function hardware element 205, the graphics engine 202 may be programmable. More specifically, the graphics engine 202 may be programmed utilizing print imaging applications, such as the print imaging application 206, in conjunction with an application programming interface (API) 207.

The arrangement and numbering of blocks depicted in FIG. 2 is not intended to imply an order of operations to the exclusion of other possibilities. Those of skill in the art will appreciate that the foregoing systems and methods are susceptible of various modifications and alterations. For example, in the embodiment described in FIG. 2, the general purpose processor 201 and the graphics engine 202 are part of printer processing component 200. However, in other embodiments of the present invention, the elements illustrated in FIG. 2 may be assembled differently. For example, in another embodiment, the graphics engine 202 may be built into the general purpose processor 201.

Figure 3:
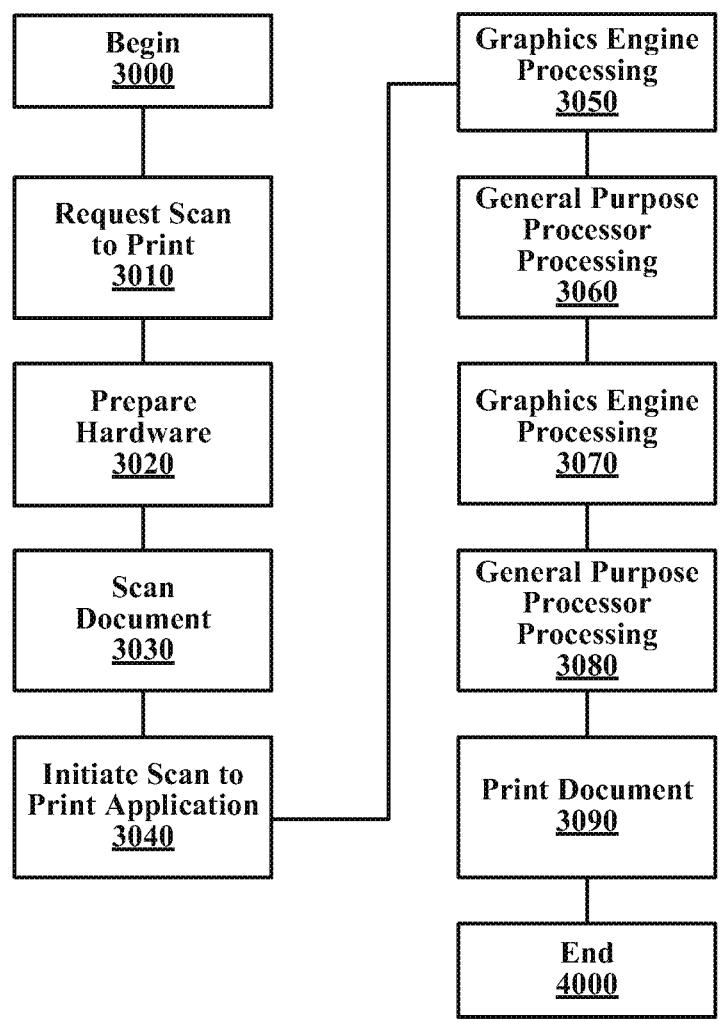
FIG. 3 is a flowchart of an example of a method of utilizing a printer processing component including a graphics engine to process a print request in accordance with an embodiment of the invention.

Turning now to FIG. 3, a flowchart of an example of a method to implement a print request at a printer, such as printer 100 (FIG. 1), using a graphics engine, such as graphics engine 202 (FIG. 2), is shown. In this example, the printer executes a scan-to-print request. The method might be implemented as a set of logic instructions stored in a machine- or computer-readable storage medium such as random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as Java, Smalltalk, C++ or the like and conventional procedural programming languages, such as the "C" programming language or similar programming languages.

The method may begin at block 3000. At block 3010, a user may initiate the scan-to-print request utilizing a printer interface, such as printer interface 102 (FIG. 1). At block 3020, a signal indicating the print-to-scan request may be received and hardware may be prepared to scan and print. In response, a general purpose processor, such as general purpose processor 201 (FIG. 1), may access various relevant software modules from a printer memory, such as printer memory 204 (FIG. 2) to initialize various hardware components, such as printer scan assembly 103 (FIG. 1), for processing. The general purpose processor may also initiate a scheduling management application, such as scheduling management application 208 (FIG. 2). At block 3030, the printer may scan the document using the printer scan assembly. At block 3040, a scan-to-print application may be initiated for processing through the general purpose processor.

At block 3050, the scan-to-print application may utilize the graphics engine to perform print imaging functions necessary to execute the scan-to-print request. As discussed above, this may be done by, issuing an API call to an API library, such as OpenGL, to utilize a function call for hardware processing for a desired print imaging application. The scheduling management application may direct an application programming interface call to the graphics engine. The interface call may direct a function call to execute a desired print imaging application available on OpenGL (e.g., shading, gamma and color correction, data reordering, and background detection, removal and de-skewing).

At block 3060, the process may have the scheduling management application direct the general purpose processor to implement print imaging functions. Again, function calls may be utilized to implement the relevant print imaging functions (e.g., image segmentation, image enhancement) on the general purpose processor. At block 3070, the process may have the scheduling management application return to the graphics engine by directing it to implement rotation, color conversion and printer correction/compensation functions. At block 3080, the process may have the scheduling management application return to the general purpose processor to implement half-toning. At this point, the document may be ready to be sent to a printer execution assembly, such as printer execution assembly 104 (FIG. 1). At block 3090, the printer execution assembly may receive the document and print it. At block 4000, the process may be terminated.

The sequence and numbering of blocks depicted in FIG. 3 is not intended to imply an order of operations to the exclusion of other possibilities. Those of skill in the art will appreciate that the foregoing systems and methods are susceptible of various modifications and alterations. For example, in other embodiments of the present invention, individual functions such as gamma correction or background detection may not be necessary or implemented. Moreover, in other embodiments of the present invention, a graphics engine instead of a general purpose processor may implement image segmentation and enhancement functionalities. Furthermore, in certain embodiments, the different processing blocks may execute concurrently.

It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding. Any represented signal lines, whether or not having additional information, may actually include one or more signals that may travel in multiple directions and may be implemented with any suitable type of signal scheme, e.g., digital or analog lines implemented with differential pairs, optical fiber lines, and/or single-ended lines.

Example sizes/mode may have been given, although embodiments of the present invention are not limited to the same. As manufacturing techniques (e.g., photolithography) mature over time, it is expected that devices of smaller size could be manufactured. In addition, well known power/ground connections and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

We claim:

1. A method comprising:
    receiving a print request to print a document;
    initializing a printer execution assembly of a printer;
    initiating, by a general purpose processor, a scheduling management application;
    receiving, at the scheduling management application, an application programming interface call;
    directing, by the scheduling management application, an application programming interface call to a graphics engine;
    directing a function call for a print imaging application on the application programming interface, the print imaging application including a print imaging application instruction;
    utilizing the graphics engine to process the print imaging application instruction; and
    executing the print request at the printer execution assembly.

2. The method of claim 1, wherein the application programming interface is Open Graphics Library (OpenGL).

3. The method of claim 1, wherein the print imaging application instruction is directed to at least one of image rendering, half-toning, decompression, color-spacing, color-correction, color-shading, color conversion, gamma correction, de-skewing function, data reordering, background detection, background removal, image rotation, printer correction, and printer compensation.

4. The method of claim 1, wherein the print imaging application instruction is at least one of a pre-video processing instruction, a post-video processing instruction, a video codec processing instruction, an image processing instruction, a protocol processing instruction, and a baseband signal processing instruction.

5. The method of claim 1, wherein the general purpose processor is an Intel Atom processor.

6. The method of claim 1, wherein the general purpose processor includes the graphics engine.

7. A computer readable storage medium comprising a set of target printer instructions, which, if executed by a processor, cause a computer to:
    receive a print request to print a document;
    initialize a printer execution assembly of a printer;
    initiate, by a general purpose processor, a scheduling management application;

receive, at the scheduling management application, an application programming interface call;

direct, by the scheduling management application, an application programming interface call to a graphics engine;

direct a function call for a print imaging application on the application programming interface, the print imaging application including a print imaging application instruction;

utilize a graphics engine to process the print imaging instruction; and execute the print request at the printer execution assembly.

8. The medium of claim 7, wherein the application programming interface is Open Graphics Library (OpenGL).

9. The medium of claim 7, wherein the print imaging application instruction is directed to at least one of image rendering, half-toning, decompression, color-spacing, color-correction, color-shading, color conversion, gamma correction, de-skewing function, data reordering, background detection, background removal, image rotation, printer correction, and printer compensation.

10. The medium of claim 7, wherein the print imaging application instruction is at least one of a pre-video processing instruction, a post-video processing instruction, a video codec processing instruction, an image processing instruction, a protocol processing instruction, and a baseband signal processing instruction.

11. The medium of claim 7, wherein the general purpose processor is an Intel Atom processor.

12. The medium of claim 7, wherein the general purpose processor includes the graphics engine.

13. A system comprising:

a transceiver to communicate wirelessly via a wireless communication protocol;

a printer display interface to display a graphical user interface (GUI);

a printer execution assembly to execute a print request, the printer execution assembly including a printer head, a supporting roller, and a document tray;

a memory device to store an application programming interface, a print imaging application including a print imaging application instruction, and a scheduling management application including a scheduling management application instruction; and a printer processing component including:

a general purpose processor to process the scheduling management application instruction; and a graphics engine to process the print imaging application instruction.

14. The system of claim 13, including a printer scan assembly to scan a document, the printer scan assembly including a document sheet support unit and a scan unit.

15. The system of claim 13, including an application specific integrated circuit coupled to the printer processing component.

16. The system of claim 13, including a fixed function hardware element coupled to the printer processing component.

17. The system of claim 13, wherein the graphics engine is to receive an application programming interface call directed by the scheduling management application.

18. The system of claim 13, wherein the application programming interface is Open Graphics Library (OpenGL).

19. The system of claim 13, wherein the print imaging application instruction is directed to at least one of image rendering, half-toning, decompression, color-spacing, color-correction, color-shading, color conversion, gamma correction, de-skewing function, data reordering, background detection, background removal, image rotation, printer correction, and printer compensation.

20. The system of claim 13, wherein the print imaging application instruction is at least one of a pre-video processing instruction, a post-video processing instruction, a video codec processing instruction, an image processing instruction, a protocol processing instruction, and a baseband signal processing instruction.

21. The system of claim 13, wherein the general purpose processor is an Intel Atom processor.

22. The system of claim 13, wherein the general purpose processor includes the graphics engine.

23. An apparatus comprising:

a memory device to store an application programming interface, a print imaging application including a print imaging application instruction, and a scheduling management application including a scheduling management application instruction;

a printer processing component including:

a general purpose processor to process the scheduling management application instruction; and a graphics engine to process the print imaging application instruction.

24. The apparatus of claim 23, further including:

an application specific integrated circuit coupled to the graphics engine to process a second print imaging application instruction; and a fixed function hardware element coupled to the graphics engine to process a third print imaging application instruction.

25. The apparatus of claim 23, wherein the graphics engine is to receive an application programming interface call directed by the scheduling management application.

26. The apparatus of claim 23, wherein the application programming interface is Open Graphics Library (OpenGL).

27. The apparatus of claim 23, wherein the print imaging application instruction is directed to at least one of image rendering, half-toning, decompression, color-spacing, color-correction, color-shading, color conversion, gamma correction, de-skewing function, data reordering, background detection, background removal, image rotation, printer correction, and printer compensation.

28. The apparatus of claim 23, wherein the print imaging application instruction is at least one of a pre-video processing instruction, a post-video processing instruction, a video codec processing instruction, an image processing instruction, a protocol processing instruction, and a baseband signal processing instruction.

29. The apparatus of claim 23, wherein the general purpose processor is an Intel Atom processor.

30. The apparatus of claim 23, wherein the general purpose processor includes the graphics engine.

* * * * *